US007594680B2

(12) United States Patent
Forde

(10) Patent No.: US 7,594,680 B2
(45) Date of Patent: Sep. 29, 2009

(54) IDENTIFICATION DOCUMENTS WITH ENHANCED SECURITY

(75) Inventor: James A. Forde, Eagan, MN (US)

(73) Assignee: DataCard Corporation, Minnetonka, MN (US)

( * ) Notice: Subject to any disclaimer, the term of this patent is extended or adjusted under 35 U.S.C. 154(b) by 832 days.

(21) Appl. No.: 10/860,178

(22) Filed: Jun. 3, 2004

(65) Prior Publication Data

US 2005/0269818 A1 Dec. 8, 2005

(51) Int. Cl.

| | |
|---|---|
| ***B42D 15/00*** | (2006.01) |
| *G09C 3/00* | (2006.01) |
| *G02B 5/18* | (2006.01) |
| *G03F 7/00* | (2006.01) |

(52) U.S. Cl. ............................ 283/94; 283/75; 283/77; 359/576; 430/2

(58) Field of Classification Search .................. 283/72, 283/74, 75, 77, 81, 86, 94, 114, 901; 359/2, 359/25, 576; 430/1, 2; 356/71

See application file for complete search history.

(56) References Cited

U.S. PATENT DOCUMENTS

| | | | | |
|---|---|---|---|---|
| 3,668,795 | A * | 6/1972 | Barker | 283/75 |
| 4,051,283 | A * | 9/1977 | Thomas et al. | 428/29 |
| 4,501,439 | A * | 2/1985 | Antes | 283/91 |
| 4,547,002 | A * | 10/1985 | Colgate, Jr. | 283/91 |
| 4,563,024 | A * | 1/1986 | Blyth | 283/91 |
| 5,032,003 | A | 7/1991 | Antes | |
| 5,128,779 | A * | 7/1992 | Mallik | 359/2 |
| 5,331,443 | A | 7/1994 | Stanisci | |
| 5,379,131 | A * | 1/1995 | Yamazaki | 359/2 |
| 5,621,515 | A * | 4/1997 | Hoshino et al. | 356/71 |
| 5,623,347 | A * | 4/1997 | Pizzanelli | 359/2 |
| 5,784,200 | A * | 7/1998 | Modegi | 359/567 |
| 5,991,057 | A * | 11/1999 | Goldstein | 359/32 |
| 6,369,919 | B1 * | 4/2002 | Drinkwater et al. | 359/2 |
| 6,902,807 | B1 * | 6/2005 | Argoitia et al. | 428/403 |

(Continued)

FOREIGN PATENT DOCUMENTS

| | | |
|---|---|---|
| EP | 1 482 443 | 12/2004 |

(Continued)

OTHER PUBLICATIONS

"LaserCard Systems Secure ID—World's Most Secure ID Card," http://www.lasercard.com/tech/secfeatures.htm, 2 pages (Date printed May 3, 2004).

(Continued)

*Primary Examiner*—Dana Ross
*Assistant Examiner*—Pradeep C Battula
(74) *Attorney, Agent, or Firm*—Hamre, Schumann, Mueller & Larson, P.C.

(57) ABSTRACT

An identification document having enhanced security and replication deterrence, while providing a simple low cost solution to other verification and authentication technologies. In one implementation, the document is provided with a multi-layer, multi-axis diffractive optical variable image device (DOVID) that is based on specific data or information on the document. The result is that the DOVID is directly tied to data or information that is specific to the document. This DOVID security feature is verifiable by the human eye so that no high levels of technology are necessary to verify authenticity. In addition, this DOVID security feature has enhanced tamper detection.

10 Claims, 5 Drawing Sheets

U.S. PATENT DOCUMENTS

| | | | | |
|---|---|---|---|---|
| 6,980,336 | B2 * | 12/2005 | Joubert et al. | 359/2 |
| 7,063,264 | B2 * | 6/2006 | Bi et al. | 235/487 |
| 2001/0046630 | A1 * | 11/2001 | Toshine et al. | 430/1 |
| 2004/0101676 | A1 * | 5/2004 | Phillips et al. | 428/323 |
| 2004/0101982 | A1 | 5/2004 | Woontner | |
| 2004/0245346 | A1 * | 12/2004 | Haddock | 235/492 |
| 2005/0129281 | A1 | 6/2005 | Ashizaki et al. | |
| 2006/0262366 | A1 * | 11/2006 | D'amato et al. | 359/2 |

FOREIGN PATENT DOCUMENTS

| | | | |
|---|---|---|---|
| JP | 2003-256786 | A | 9/2003 |
| WO | 96/22579 | | 7/1996 |
| WO | 99/51445 | | 10/1999 |
| WO | 02/075649 | A1 | 9/2002 |
| WO | 03/027952 | A1 | 4/2003 |
| WO | 03/075217 | A1 | 9/2003 |
| WO | WO 03/075217 | | 9/2003 |

OTHER PUBLICATIONS

"Diffractive Optically Variable Image Devices: Functional Beauty of DOVIDs, Paper, Film & Foil Converters PFFC, New Era World-Class Converting Machinery Systems Customer Focused/Technology Driven," http://pffc-online.com/ar/paper_dovids_functional_beauty/, 6 pages (Aug. 1, 2002).

"Notification of First Office Action (National Phase of PCT Application)" issued by the State Intellectual Property Office of the People's Republic of China Oct. 24, 2008.

* cited by examiner

IDENTIFICATION DOCUMENTS WITH ENHANCED SECURITY

TECHNICAL FIELD

The invention relates to identification documents and the production thereof, as well as to the use of diffractive optically variable image device (DOVID) technology in the production of identification documents.

BACKGROUND

Diffractive optically variable image devices (hereinafter DOVIDs) are diffractive images based on optical interference techniques. One class of DOVID is a hologram where multiple perspective dimensionality is preserved. In layman's nomenclature, the word "hologram" is commonly substituted as a generic term for DOVIDs. Another form of DOVID is grating imagery where only a single perspective dimensionality is preserved.

DOVIDs have been in used in many applications to protect replication sensitive documents. Some of the first uses of DOVIDs involved the protection of credit cards. Since then, several types of diffractive imaging technology have been developed to increase the difficulty of producing counterfeit documents.

All DOVIDs present a reflected image which changes appearance when tilted slightly at various angles. This unique characteristic makes a DOVID image impossible to copy or imitate by conventional printing and computer based graphical hardware and software processes.

Current DOVID technology used to protect replication sensitive documents, for example identification documents such as credit cards, relies on generic DOVIDs that have no ties to the actual information that is present on the documents. Further, DOVID material that is currently in use is becoming increasingly available on the gray market in which the DOVID material is initially legally obtained but later sold or distributed illegally or under questionable circumstances. As a result, conventional generic DOVIDs are becoming far from secure.

What is needed is an enhanced security document, for example an identification document such as a passport, driver's license, credit card, identification card, and the like, that more effectively utilizes DOVID technology, as well as improved methods relating to the production of such documents.

SUMMARY

The invention provides an improved identification document, and improved methods of making an identification document, having enhanced security and replication deterrence, while providing a simple low cost solution to other verification and authentication technologies.

The invention utilizes a security feature in the form of DOVID technology that, in one embodiment, is integrated with specific data or information on the document to be secured. The result is that the security feature is directly tied to data or information that is specific to the document. The security feature is verifiable by the human eye so that no high levels of technology are necessary to verify authenticity. In addition, the security feature has enhanced tamper detection.

The concepts of the invention could be used on any document in which security (e.g. tamper detection, verification, authentication) of the document is a concern and unauthorized replication of the document is undesirable. Examples of documents that could benefit from the concepts of the invention include cards such as identification cards, driver's licenses, credit cards and the like, as well as passports.

In one embodiment of the invention, a document is formed with a multi-layer DOVID that has multiple axes of diffraction. The number of DOVID layers can vary depending upon the security requirements, although it is preferred that there be at least two DOVID layers. The DOVID can be formed over an image or text that is on the document, with the DOVID formed in precise registration with the image or text. The DOVID is specific to, and based on, the image or text that it is formed over. As a result, the DOVID is unique to the document that it is formed on thereby reducing the potential for counterfeiting and enhancing the ease of verifying document integrity.

In a first aspect of the invention, an identification document comprises a document surface having information relating to the intended holder of the identification document provided thereon, and a diffractive optically variable image device is on the document surface, where the image device is based on at least a portion of the information on the document surface.

In another aspect of the invention, an identification document comprises a document surface having information relating to the intended holder of the identification document provided thereon, and a multi-layer diffractive optically variable image device on the document surface, where the diffractive optically variable image device has multiple axes of diffraction and is formed on the document surface.

In still another aspect of the invention, an identification document comprises a document surface having information provided thereon, and a diffractive optically variable image device on the document surface, where the diffractive optically variable image device is created after the information is formed on the identification document and is based on at least a portion of the information.

In still another aspect of the invention, a method of producing an identification document comprises providing an identification document having a document surface with information, including information relating to the intended document holder, formed thereon, and forming a diffractive optically variable image device on the document surface that is at least in part based on at least a portion of the information.

For a better understanding of the concepts of the invention, the advantages and objects obtained thereby, reference should be made to the drawings which form a further part hereof, and to the accompanying description, in which there is described a preferred embodiment of the invention.

DETAILED DESCRIPTION

Figure 1:
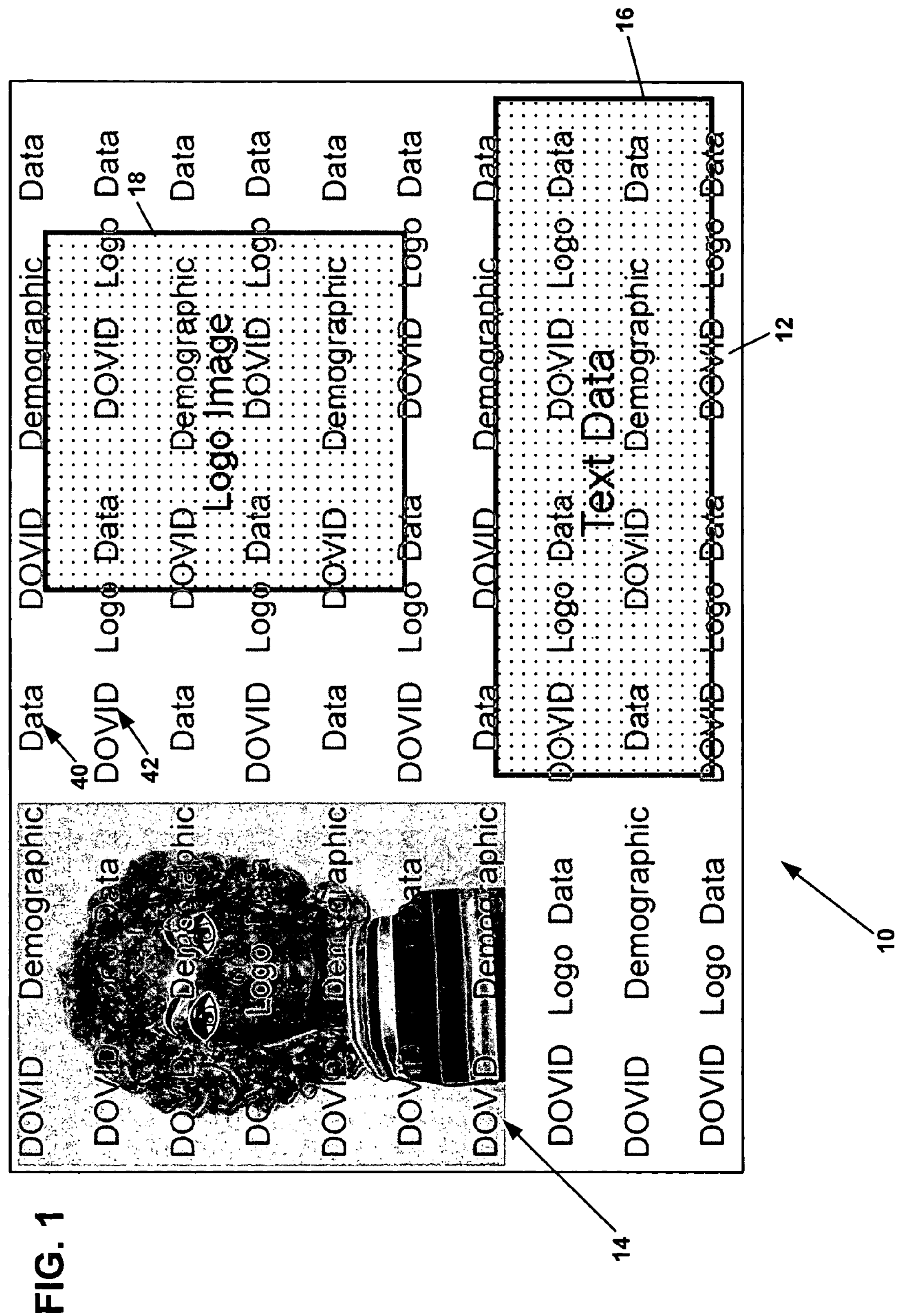
FIG. 1 illustrates a card format suitable for employing the DOVID technology according to the invention.

An identification document capable of utilizing the concepts of the invention is illustrated in FIG. 1. The document is illustrated as a card 10 which could be, for example, an identification card, a driver's license, a credit card or the like. Although the inventive concepts will be described herein in relation to the document being a card, it to be realized that the inventive concepts could be utilized on any document, for example a passport, in which security (e.g. tamper detection, verification, authentication) of the document is a concern and unauthorized replication of the document is undesirable.

The card 10 has a card surface 12 upon which is located a variety of information, including information relating to the intended holder of the identification document, including one or more of a photographic image 14 and text 16, and information unrelated to the intended holder of the identification document, for example a logo image 18. The image 14 is typically of the intended card holder, while the text 16 can include, for example, information on the intended card holder such as the card holder's name and address, information relating to the card issuer such as the employer, or the card number. The logo image 18 can be of the type often found on cards, for example a corporate logo, a logo of the entity that issued the card, etc. The card 10 can include various combinations of one or more of the image 14, text 16 and logo image 18, as well as other data. The card 10 can also include other types of information relating to the intended card holder, either in addition to, or separate from, one or more of the above types of information, for example one or more fingerprints of the card holder and random information that uniquely identifies the card holder.

The image 14, text 16 and logo image 18 can be printed onto the card surface 12 using suitable card printing technology, such as dye sublimation. The image 14 and logo image 18 are often multi-color images that result from Yellow-Magenta-Cyan (YMC) dye sublimation printing, while the text 16 is typically black also resulting from dye sublimation printing. Equipment for performing multi-color and monochromatic dye sublimation printing on card surfaces is available from DataCard Corporation of Minnetonka, Minn.

The concepts of the invention will be further described in relation to the image 14 that is YMC printed onto the card surface 12. However, the inventive concepts described herein could also be applied to the text 16 and logo image 18 as well.

As described in more detail below, the invention provides a DOVID security feature that is dictated by and unique to the image 14. In one embodiment, the security feature is formed over the image 14 in registration therewith. The DOVID security feature is preferably a multi-layer, multi-axis of diffraction feature that is formed over the image 14. Each layer of the DOVID security feature comprises a layer of DOVID material in the form of a diffraction grating printed onto the image 14. The result is that when the image 14 is viewed from different orientations, the image 14 that is seen by the naked eye changes appearance.

The image 14 over which the DOVID security feature is formed is a white light image defined as an image that is visible in ordinary white light and which does not change color with changes in orientation.

Figure 2:
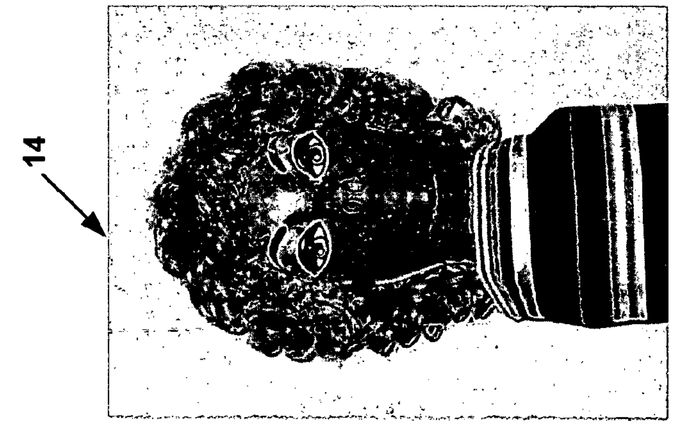
FIG. 2 is an example of an image that can be printed on a card.

Turning now to FIG. 2, an example of a dye sublimation printed photographic image 14 is shown. It is to be understood that the image 14 is actually a YMC, multi-color image, although the various colors are not apparent from FIG. 2.

To produce the DOVID security feature, a segmentation process is performed on the image 14 in FIG. 2, in which the image 14 is segmented into a predetermined number of segments based on pixel intensities. Each segment covers a range of pixel intensities. For example, one segment could comprise pixel intensities from 0-84, a second segment could comprise pixel intensities from 85-169, and a third segment could comprise pixel intensities from 170-255. To perform segmentation, the data used to print the image 14 is processed and the data representing the various pixels of the image 14 are placed into the appropriate segment based on the resulting pixel intensity to form separate data sets. Segmentation can be performed by a single point process of examining each resulting pixel in a progressive x, y coordinate system, or by the use of a look-up table.

For example, if the number of desired segments is three, the data set of segment 1 would contain the data resulting in pixels whose intensities fall within the intensity range assigned to segment 1, for example 0-84. Likewise, the data set of segment 2 would contain the data resulting in pixels whose intensities fall within the intensity range assigned to segment 2, for example 85-169, while the data set of segment 3 would contain the data resulting in pixels whose intensities fall within the intensity range assigned to segment 3, for example 170-255.

Figure 3A:
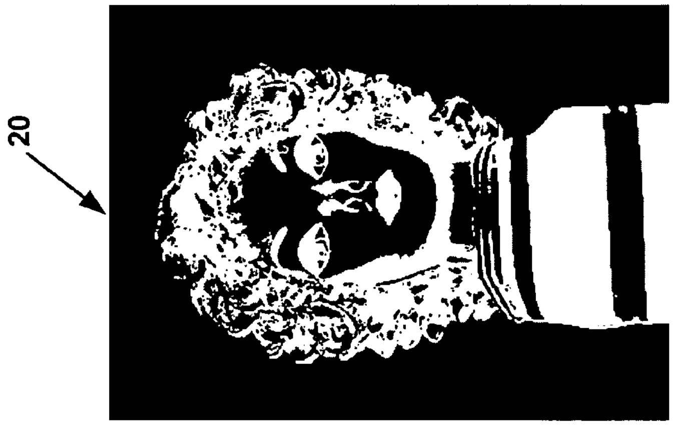
FIGS. 3A-C illustrate images of pixel segments that are created from the image in FIG. 2.
Figure 3B:
Figure 3C:
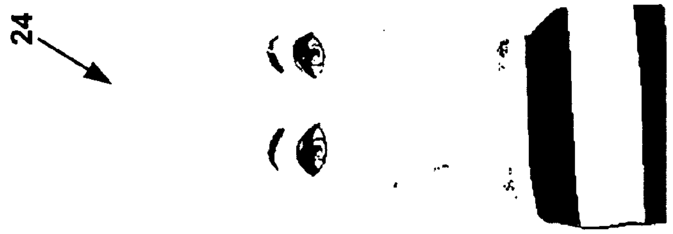

FIGS. 3A-C are print-outs of data sets of an exemplary segmentation process on the image in FIG. 2. FIG. 3A shows a print out 20 of the data set of the lower one-third of the pixel values which can be designated as segment 1. FIG. 3B shows a print out 22 of the data set of the middle one-third of pixel values which can be designated as segment 2. FIG. 3C shows a print out 24 of the data set of the upper one-third of pixel values which can be designated as segment 3. Although the segmentation has been described as being in equal segments (⅓, ⅓, ⅓), it is to be realized that the segmentation need not be equal, for example by using a technique such as histogram analysis.

Once segmentation is complete, the DOVID security feature is produced by printing a DOVID material layer in the form of a diffraction grating for each segment. The grating of each DOVID layer is arranged at a different angle from the other DOVID layers. A material suitable for use in forming the DOVID grating layers is disclosed in U.S. patent application Ser. No. 10/605,139, and is produced by ITW Holopak of East Brunswick, N.J.

Figure 6:
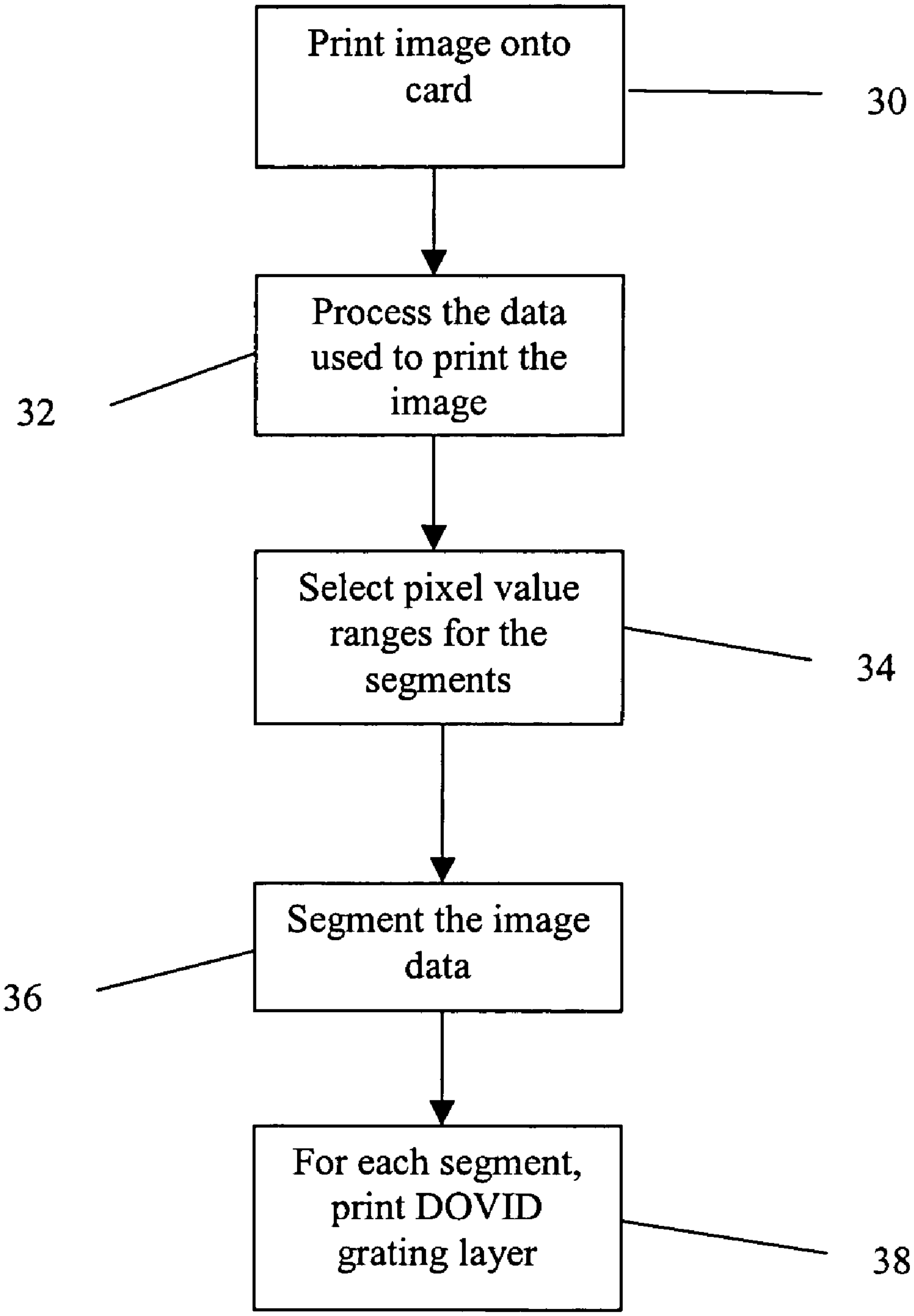
FIG. 6 is a flowchart of steps in the method of creating a secure card.

With reference to FIG. 6, to begin creating the DOVID security feature, the image 14 is initially printed onto the card surface 12 at step 30. Next, at step 32, the data used to print the image 14 is processed. Segments having selected ranges of pixel intensity values are chosen at step 34, and the image data is then segmented at step 36 by assigning the pixels that result from the image data to the appropriate segment to create data sets.

Once the image data has been segmented, the multi-layer, multi axis DOVID can then be formed over the image. To aid in describing the invention, assume that the print-out 20/segment 1 in FIG. 3A is used to produce a first DOVID layer with a diffraction grating at a first angle, print-out 22/segment 2 in FIG. 3B is used to produce a second DOVID layer with a diffraction grating at a second angle, and print-out 24/segment 3 in FIG. 3C is used to produce a third DOVID layer with a diffraction grating at a third angle.

To form the first DOVID layer, the data from segment 1 is sent to the printer to print DOVID material as a diffraction grating at a first grating angle onto the image 14 in registration with the image. The resulting first DOVID layer replicates the image shown in FIG. 3A. The second DOVID layer is formed over the first DOVID layer by sending the data from segment 2 to the printer to print DOVID material as a diffraction grating at a second grating angle onto the first DOVID layer and over the image 14 in registration with the image. The resulting second DOVID layer replicates the image shown in FIG. 3B. The third DOVID layer is formed over the second DOVID layer by sending the data from segment 3 to the printer to print DOVID material as a diffraction grating at a third grating angle onto the second DOVID layer and over the image 14 in registration with the image. The resulting third DOVID layer replicates the image shown in FIG. 3C.

The result is a card that has the normal image 14, with the addition of a real time created, three-axis DOVID image that replicates the image 14 and is formed in registration therewith, but with the characteristics of the DOVID. Each DOVID layer is formed by a diffraction grating having an axis different than the grating axis of the other DOVID layers so the DOVID layers do not nullify each other. Therefore, the images shown in FIGS. 3A-C are formed over the image 14 and are visible when the orientation of the card is changed. The DOVID is not a generic, pre-formed device that is applied to many cards as is conventionally done. Instead, the DOVID is created specifically for each card and is based at least in part on at least a portion of the information on the card. The DOVID can thus be referred to as being "card specific" or more generically "document specific". A DOVID that is based on the information on the card surface means that the DOVID is formed by using the printed information or is formed by using the data that is used to produce the printed information.

Although the use of three segments and resulting three DOVID layers has been described, the DOVID security technology of the invention could be implemented using two or more DOVID layers. Further, a single layer could be formed over the image 14 if a simple holographic effect is desired.

In order to protect the DOVID and the information on the card, a protective overlay can be applied over the card surface 12 after the DOVID is formed.

The above described example discussed segmentation of the multi-color image 14. However, segmentation can also be used on a black and white image (or other information on the card) in order to produce a DOVID security feature based on the black and white image. An example of segmentation of a black and white image to produce a DOVID security feature according to the concepts of the invention will now be discussed with reference to FIGS. 4A-D. For this explanation, it is to be assumed that the image to be segmented is a black and white image, rather than a multi-color, YMC image.

Figure 4A:
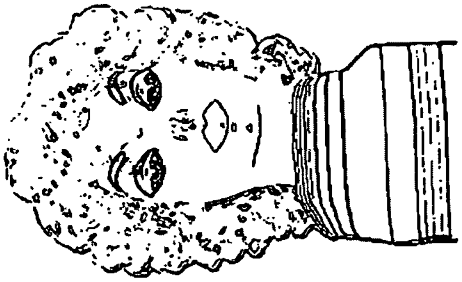
FIGS. 4A-D are images illustrating a bi-level segmentation process.

Initially, an edge detection algorithm such as a Laplacian, Sobel, Prewitt, etc. processes the original raster image. This creates the image data as shown in FIG. 4A. The original raster image is also subjected to a threshold process to create an appropriate black and white image. All of the white pixels are assigned to one segment that will be used to create one DOVID layer. All the black pixels are assigned to a second segment that will be used to create the second DOVID layer. The pixel information from the edge detection process (FIG. 4A) is assigned to a third segment that will be used to create the third DOVID layer. To insure that the DOVID maintains the greatest amount of perception information, the edge data (FIG. 4A) is subtracted from the black image data resulting in the image information contained in FIG. 4B. In addition, the image data comprising the white threshold data is inverted to make a negative image. The edge information (FIG. 4A) is then subtracted from the inverted white image data resulting in the image information contained in FIG. 4C.

To further describe this process, assume the black pixels are assigned a value of one and the white pixels are assigned a value of zero. When the image in FIG. 4A is subtracted from the threshold black image data, any corresponding pixels in that data that are also black in FIG. 4A will be turned white (i.e. 1-1). If the corresponding pixels in the image were white, then subtracting the black pixels would result in a negative value (0-1). Only positive value pixels would be printed and represented in the illustrated images as black.

Figure 4B:
Figure 4C:
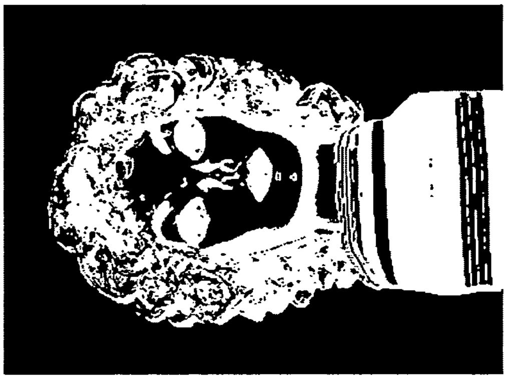
Figure 4D:
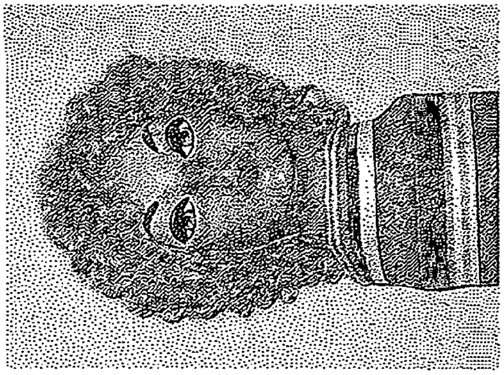

In FIGS. 4A-C, if a pixel is black it will be printed on the document either as part of the white light image or as part of the multiple DOVID layers. FIG. 4D illustrates the image that would be printed by the K or black panel of the print ribbon and that the images in FIGS. 4A-C would be formed over. The image constitutes the pixels of the white light image and is created by accepted dithering practices. FIGS. 4A-4C each form one layer of the DOVID, with each layer having a different diffraction grating axis as discussed above.

Figure 5:
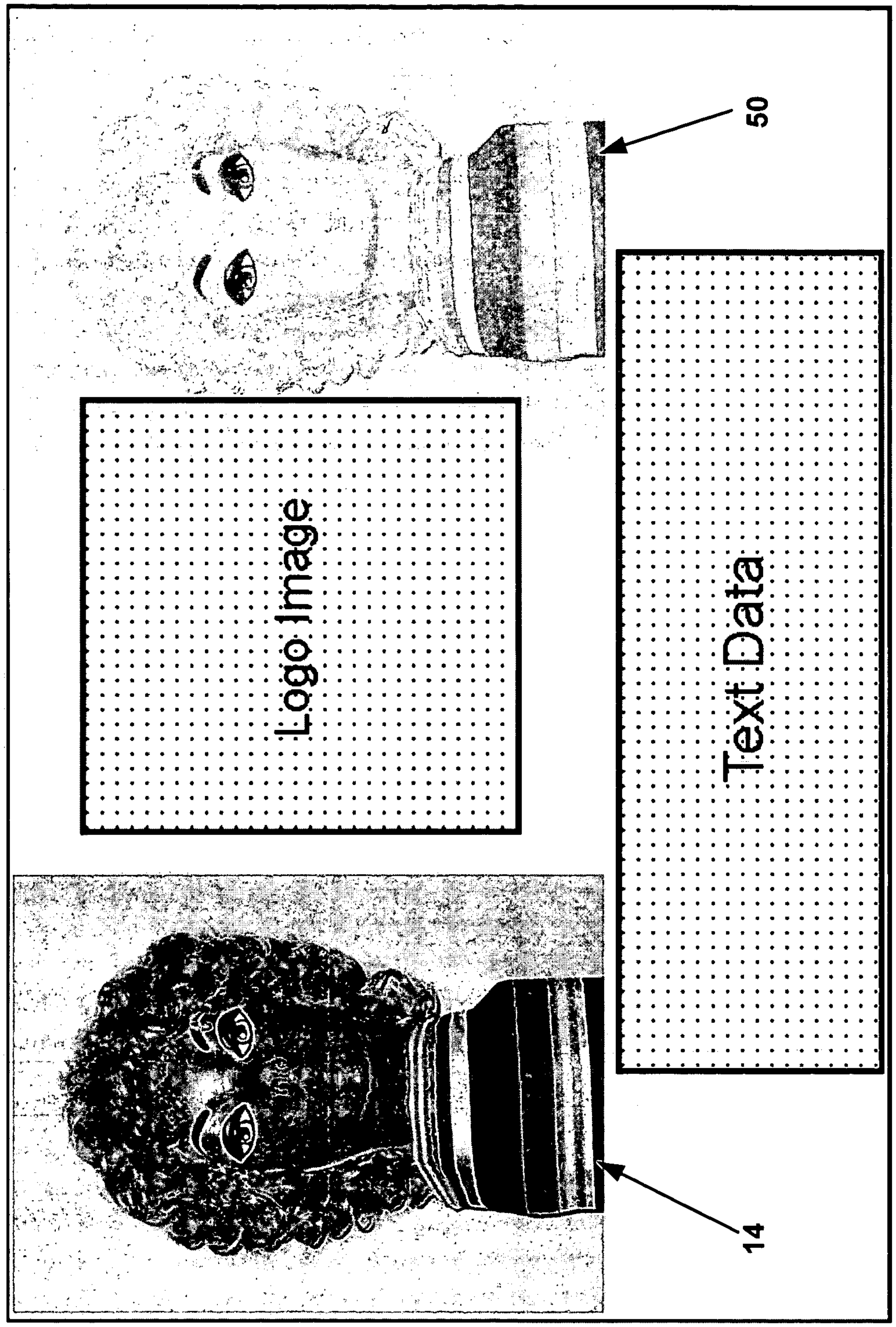
FIG. 5 illustrates a card with an offset DOVID according to the invention.

The DOVID security features described herein could be produced over any other information on the card 10. Further, the DOVID layers could be offset from the information or a combination of offset and registered. FIG. 5 illustrates a DOVID 50 that is created as discussed above for FIGS. 3A-C, but which is offset from the image 14.

Additional implementations of the DOVID security technology described herein are illustrated in FIG. 1. In one, a DOVID that is based at least in part on at least a portion of the text 16 is produced in multiple lines 40 across the surface 12 of the card 10. In the implementation shown in FIG. 1, each line 40 extends substantially the entire length of the card, and the lines are spaced from one another along substantially the entire height of the card, although other configurations are possible. The text upon which the DOVID is based could be, for example, the card holders name. In one version, the card holders entire name could be reproduced as a DOVID, in which the name repeats in each line 40, and forms the background to the card.

In another implementation, a DOVID that is based at least in part on at least a portion of the logo image 18 is produced in multiple lines 42 across the surface 12 of the card 10. In the implementation shown in FIG. 1, each line 42 extends substantially the entire length of the card, and the lines are spaced from one another along substantially the entire height of the card, although other configurations are possible. In one version, the entire logo image could be reproduced as a DOVID, in which the DOVID logo repeats in each line 42, and forms the background to the card.

The technology and concepts described herein can be further enhanced by utilizing microprinting on the last (or uppermost) layer of the DOVID.

The above specification, examples and data provide a complete description of the manufacture and use of the inventive technology and concepts. Since many embodiments of the inventive technology and concepts can be made without departing from the spirit and scope of the invention, the invention resides in the claims hereinafter appended.

What is claimed is:

1. A method of producing a security document, comprising:

providing a specific security document having a document surface with first information unique to the specific security document formed thereon;

dividing the first information into a plurality of segments, each segment based on a different portion of the first information; and for each segment, forming a diffraction grating layer, each diffraction grating layer having an axis of diffraction that is different from the other diffraction grating layers to form a multi-layered diffractive optically variable image device on the security document, and printing the diffractive optically variable image device on the document surface.

2. The method of claim 1, wherein the image device is based at least in part on at least a portion of the first information on the document surface.

3. The method of claim 1, comprising forming the grating layers over the first information that has been segmented.

4. The method of claim 1, wherein providing a security document comprises providing a card.

5. The method of claim 1, further comprising providing microprinting on an uppermost layer of the grating layers.

6. The method of claim 1, comprising forming the diffractive optically variable image device on the document surface offset from the information.

7. The method of producing a security document of claim 1, wherein the first information unique to the specific security document is one selected from the group consisting of: a photographic image of an intended card holder, the name of the intended card holder, an address of the intended card holder, one or more fingerprints of the intended card holder, and random information that uniquely identifies the intended card holder.

8. A method of producing a security document, comprising:

providing a specific security document having a document surface with first information unique to the specific security document formed thereon;

dividing the first information into a plurality of segments, each segment based on a different portion of the first information; and for each segment, forming a diffraction grating layer, each diffraction grating layer having an axis of diffraction that is different from the other diffraction grating layers to form a multi-layered diffractive optically variable image device on the security document, and printing the first information that is segmented onto the document, and forming each diffraction grating layer comprises printing each diffraction grating layer.

9. The method of claim 8, comprising printing each diffraction grating layer such that the diffraction grating layers are registered with the printed information that has been segmented.

10. A method of producing a security document, comprising:

providing a specific security document having a document surface with first information unique to the specific security document formed thereon;

dividing the first information into a plurality of segments, each segment based on a different portion of the first information, and each segment comprises a separate range of pixel intensities of the first information; and for each segment, forming a diffraction grating layer, each diffraction grating layer having an axis of diffraction that is different from the other diffraction grating layers to form a multi-layered diffractive optically variable image device on the security document.

* * * * *